INVENTORS
WILLIAM G. ADAMSON
ROLLIN A. BONNELL
ROBERT H. FEUCHT

*R.H. Hatton*
ATTORNEY

United States Patent Office 3,396,918
Patented Aug. 13, 1968

3,396,918
EXPANDABLE ADAPTER
William G. Adamson, Canfield, and Rollin A. Bonnell and Robert H. Feucht, Cuyahoga Falls, Ohio, assignors to The Goodyear Tire & Rubber Company, Akron, Ohio, a corporation of Ohio
Filed Jan. 9, 1967, Ser. No. 607,921
11 Claims. (Cl. 242—72)

ABSTRACT OF THE DISCLOSURE

An elastomeric tubular adapter over an expandable steel mandrel for insertion into an already coiled roll of strip stock for handling or recoiling in some instances. Coils of widely varying inside diameters may be processed without changing mandrel segments which would require partial dismantling. The adapter design provides substantial uniform radial expansion with insignificant effect on the wall thickness.

---

The present invention relates to expandable adapters and more specifically to expandable adapters of elastomeric material for use with pay-off reels and recoilers in handling large coils of material such as strip steel.

The invention

In the present day practices, expandable segmented steel mandrels are used as standard coil-handling equipment. In the steel industry, it is often necessary to handle various size coils of strip steel having both large and small coil openings. For example, when a coil has an inside diameter greater than the diameter of the mandrel when fully expanded, it is necessary to partially dismantle the mandrel and insert larger expanding mandrel segments to accommodate the larger inside diameter of the coil. This dismantling operation involves considerable down time and the resulting loss of production especially when it becomes necessary to make several such adjustments to complete specific orders.

One means of reducing this down time is to place a sleeve or adapter of elastomeric material over the expandable steel mandrel to provide additional circumferential and radial expansion without changing the mandrel segments. For example, to handle coils having larger inside diameters, the mandrel and adapter assembly is inserted into the opening of the coil so that the coil may then be handled in the usual manner. Because of the desirability of attaining uniform circumferential and radial expansion of the adapter when coils of varying inside diameters are being handled, it is important that the original wall thickness of the adapter remains substantially unchanged throughout all of the operating conditions from the unexpanded to fully expanded mandrel positions. It has been determined that by providing the adapter with spaced localized stress areas, the adapter will expand along with the mandrel without any substantial change in the wall gauge.

Expandable sleeves of various types associated with mandrel shafts are not new in the art. The paper industry, in particular, has employed expandable core shafts for supporting rolls of paper during winding or unwinding procedures, and the steel industry has also been using expandable mandrels for various coiling and recoiling operations. However, the above-mentioned devices have had a more or less smooth cylindrical surface and have not been designed and constructed to facilitate expansion without significant change in wall gauge which is a principal feature of the present invention. The localized stress areas of the present invention substantially eliminate the need for exact cross-sectional dimensions because of the relative ease of expansion.

It is therefore an object of the present invention to provide an elastomeric sleeve capable of circumferential and radial expansion while still substantially maintaining its original wall thickness.

Another object of the present invention is to provide a simple and economical method of handling coils of sheet stock which have widely varying inside diameters.

A further object of this invention is to provide an elastomeric tubular adapter which requires less internal pressure to effect the expansion.

A still further object is to provide protection to the inner wraps of coils of sheet stock in order to reduce scrap and facilitate coil handling.

An even further object of this invention is to provide protection for the mandrel segments.

Other objects and advantages of this invention will become apparent hereinafter as the description thereof proceeds, the novel features, arrangements and combinations being clearly pointed out in the specification as well as the claims thereunto appended.

Figure 1:
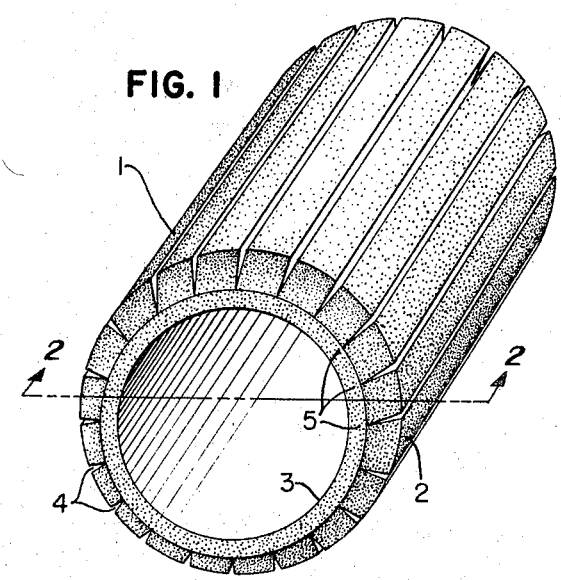
FIG. 1 is a perspective view of one form of the adapter illustrating this invention.
Figure 2:
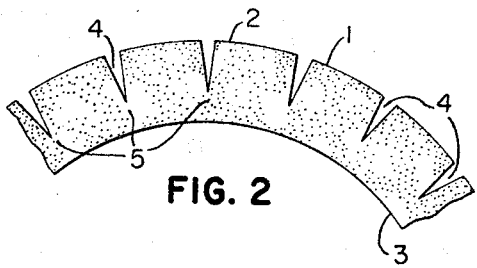
FIG. 2 is a fragmentary elevational view of the adapter taken substantially through 2—2 of FIG. 1.

Referring now to the drawings, FIGS. 1 and 2 show a tubular adapter 1 preferably formed of elastomeric material and having outer peripheral surface 2 and inner peripheral surface 3. In the outer peripheral surface 2 of adapter 1, a series of radially extending slots 4 are formed so as to extend lengthwise of adapter 1. Slots 4 may be formed during molding of the adapter 1 or may be cut or machined after molding. When adapter 1 is expanded outwardly, the portions 5 of the adapter 1 lying immediately below slots 4, as is apparent, are of substantially less area than the remaining portions of adapter 1. This permits substantially the entire circumferential stress necessary to expand adapter 1 to be localized in portions 5 thus retaining the original radial thickness of the intervening portions of the adapter 1. The particular configuration and dimensions of slots 4 are determined by the maximum amount of expansion desired for the adapter as well as the physical properties of the particular elastomeric compound used.

Figure 3:
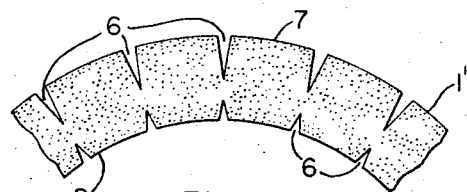
FIG. 3 is a fragmentary elevational view of one modification of the invention.

In FIG. 3, another embodiment of this invention is illustrated in which the localized stress areas are provided by a plurality of substantially parallel uniform spaced slots 6, in both the outer surface 7 and the inner surface 8 of the adapter 1'. Preferably all the slots 6 extend the entire length of adapter 1' and are arranged in pairs so as to lie on a radius.

Figure 4:
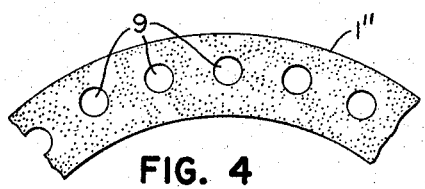
FIG. 4 is a fragmentary elevational view of another form of the invention.

Another embodiment of the invention is shown in FIG. 4 in which the localized stress areas in adapter 1" are provided by a plurality of substantially uniformly spaced openings 9 extending through the adapter wall from end to end. The openings 9 may be formed either during molding or drilled subsequently.

Figure 5:
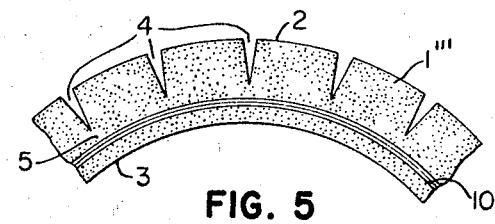
FIG. 5 is a fragmentary elevational view of a modification of the invention shown in FIG. 2.

FIG. 5 shows still another embodiment of the invention in which, for the purposes of illustration, the adapter 1''' as shown in FIG. 2, contains a reinforcement layer 10 included in the wall thereof and spaced radially between the bottom of slots 4 and inner surface 3 and extending the entire length thereof. Almost any of the usual reinforcing materials will be acceptable, but it has been found that a textile reinforcement such as tire cord laid on the bias will not interfere unduly with the expansion of the adapter yet will provide additional strength and aid in attaining the desired functional characteristics of the adapter.

Figure 6:
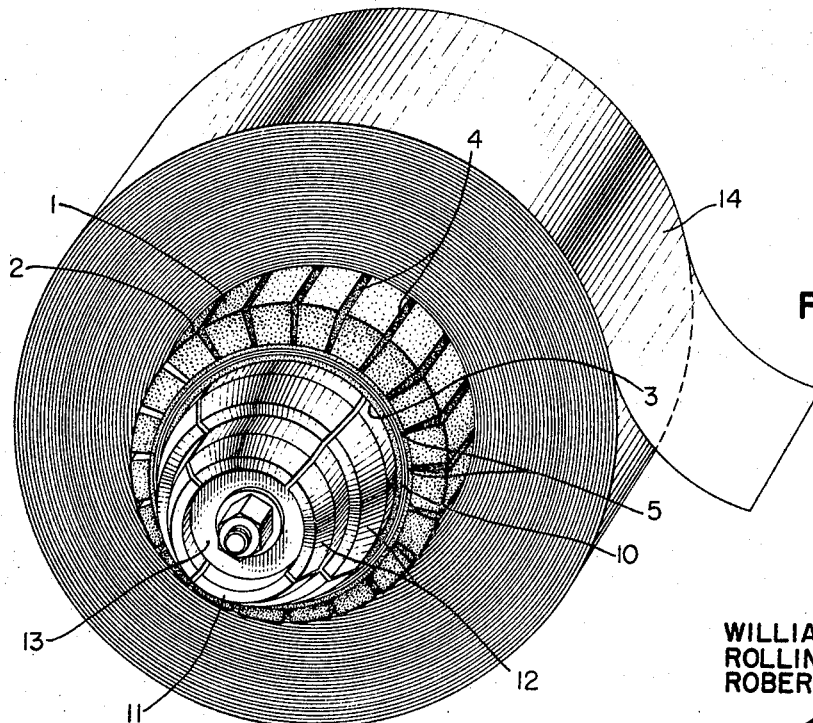
FIG. 6 is a perspective view illustrating the use of the invention.

FIG. 6 illustrates the typical use of the adapter 1 in a coil-handling apparatus with a power-expanded segmented steel mandrel 11, with mandrel segments 12 mounted on shaft 13. The adapter 1 is slipped over the mandrel segments 12, the particular adapter being selected so as to be capable of expanding sufficiently to engage firmly the surface of the opening of a coil of strip steel 14. Once the mandrel 11 and adapter 1 are positioned within the coil opening, the mandrel 11 is expanded to cause adapter 1 to expand into firm engagement with the coil 14 so that the coil 14 may be handled as desired. As previously explained, substantially the entire expansion of adapter 1 occurs without significant change in the wall gauge of adapter 1 due to the elongation being localized in the area 5 below slots 4 in the outer surface 2 of adapter 1. Since the adapter 1 is made of an elastomeric material, the surfaces 2 and 3 will readily conform to the surfaces of both the opening in coil 14 and mandrel 11 which materially assists in providing an excellent holding or grip on the coil. Since this adapter provides a convenient and quick means of handling a greater range of coil opening sizes, the need to rewind the coils is less frequent and the scrap usually created by such rewinding is essentially eliminated. The adapter 1 will also provide protection for mandrel segments 12 of mandrel 11.

The adapter 1 may be made of any suitable elastomeric material such as rubber which has the property of being able to expand and contract, but preferably with good recovery and negligible permanent set properties. Almost any natural or synthetic rubber compounded in a manner known to the art will be satisfactory for this purpose but it has been found that chloroprene rubber with the formula 2-chlorobutadiene-1,3 or mixtures which include chloroprene is particularly suitable for this use. Since during the coiling and recoiling operation, the adapter 1 will come in contact with substances such as grease and processing oil, the material preferably should be resistant to these substances.

While certain representative embodiments and details have been shown for the purpose of illustrating the invention, it will be apparent to those skilled in the art that various changes and modifications may be made therein without departing from the spirit or scope of the invention.

We claim:

1. A reuseable adapter for mounting on an expandable mandrel wherein the adapter will expand simultaneously with the expansion of the mandrel, said adapter comprising a tubular wall of rubber-like material having inner and outer peripheral surfaces, said wall containing a plurality of circumferentially spaced substantially longitudinally extending localized stress areas having greater elasticity than the intervening portions of the adapter therebetween thereby permitting expansion of the adapter without substantial change in the original wall thickness thereof.

2. An adapter as claimed in claim 1 wherein the stress areas are formed by a plurality of substantially uniformly spaced radial slots in the outer surface of the adapter and extending generally axially thereof.

3. An adapter as claimed in claim 1 wherein the stress areas are formed by a plurality of substantially uniformly spaced radial slots in the outer and inner surfaces of the adapter and extending generally axially thereof.

4. An adapter as claimed in claim 1 wherein the stress areas are formed by a plurality of substantially uniformly spaced openings in the wall of the adapter and extending generally axially thereof.

5. An adapter as claimed in claim 1 wherein the wall includes at least one layer of reinforcing material interiorly thereof and extending substantially the length of the adapter.

6. In combination with a coil-handling apparatus of the type wherein an expandable mandrel is inserted into the opening of a coiled roll of strip stock the improvement which comprises an adapter positioned over the mandrel and adapted to expand simultaneously with the expansion of the mandrel to firmly engage the opening in the roll of strip stock, said adapter comprising a tubular sleeve of elastomeric material having inner and outer peripheral surfaces, the wall of said sleeve containing a plurality of circumferentially spaced localized stress areas extending substantially longitudinally along the length thereof, said stress areas having greater elasticity than the intervening portions of the adapter therebetween thereby permitting expansion of the adapter without substantial change in the original wall thickness thereof.

7. The improvement as claimed in claim 6 wherein the stress areas are formed by a plurality of substantially uniformly spaced radially slots in the outer surface of the adapter and extending generally axially thereof.

8. The improvement as claimed in claim 6 wherein the stress areas are formed by a plurality of substantially uniformly spaced radial slots in the outer and inner surfaces of the adapter and extending generally axially thereof.

9. The improvement as claimed in claim 6 wherein the stress areas are formed by a plurality of substantially uniformly spaced openings in the wall of the adapter and extending generally axially thereof.

10. The improvement as claimed in claim 6 wherein the wall includes at least one layer of reinforcing material interiorly thereof and extending substantially the length of the adapter.

11. The improvement as claimed in claim 6 wherein the elastomeric material is a rubbery polymer of a 2-chlorobutadiene-1,3.

References Cited

UNITED STATES PATENTS 2,659,543  11/1953  Guyer.
2,733,022  1/1956  Grody _____ 242—72

STANLEY N. GILREATH, *Primary Examiner.*

N. L. MINTZ, *Assistant Examiner.*